US006449277B1

(12) United States Patent
Kim

(10) Patent No.: US 6,449,277 B1
(45) Date of Patent: Sep. 10, 2002

(54) INTERLEAVER FOR PARALLEL 8 BIT CELL OF ATM SYSTEMS AND A METHOD THEREFOR

(75) Inventor: Jae-Hyeong Kim, Kwangju-kwangyokshi (KR)

(73) Assignee: Hyundai Electronics Industries, Co., Ltd.

( * ) Notice: Subject to any disclaimer, the term of this patent is extended or adjusted under 35 U.S.C. 154(b) by 0 days.

(21) Appl. No.: 09/218,240

(22) Filed: Dec. 22, 1998

(30) Foreign Application Priority Data

Dec. 26, 1997 (KR) .............................. 97-74048

(51) Int. Cl.[7] .............................. H04L 12/28

(52) U.S. Cl. ........................... 370/395.61; 370/395.63; 370/395.65; 370/395.64

(58) Field of Search .................. 370/395.1, 395.2, 370/395.63, 236.2, 333, 389, 392, 394; 711/212, 227

(56) References Cited

U.S. PATENT DOCUMENTS

| | | | |
|---|---|---|---|
| 5,568,482 A | 10/1996 | Li | 370/79 |
| 5,768,274 A * | 6/1998 | Murakami et al. | 370/395 |
| 5,995,507 A * | 11/1999 | Fujita | 370/395 |
| 6,061,820 A * | 5/2000 | Nakakita et al. | 714/751 |
| 6,157,642 A * | 12/2000 | Sturza et al. | 370/389 |
| 6,236,466 B1 * | 7/2001 | Hinedi et al. | 714/755 |

OTHER PUBLICATIONS

Shinm–Tsong Sheu and Tzu–Fang Sheu, "A Hibird Data/header Interleving Strategy for Wireless ATM Network", IEEE Jan. 1999.*
Kwok–Leung Chung and Tsz–Mei Ko, "Performance Improvement in ATM Networks Using Interleaved Erro Correcting Code", IEEE Aug. 1994.*
J. Bibb Cain and N. McGregor, "A Recomment Error Control Architecture for ATM Networks with Wireless Link", IEEE Jan. 1997.*
Shiann–Tsong Sheu and Chang–Huang Wang, "A Cell Discarding Strategy to Reduce Cell Error Rate in Wireless ATM Networks", IEEE Jan. 1997.*

* cited by examiner

Primary Examiner—Hassan Kizou
Assistant Examiner—Thai Hoang
(74) Attorney, Agent, or Firm—Lackenbach Siegel LLP

(57) ABSTRACT

An asynchronous transfer mode (ATM) system having an interleaver of 8 bit parallel cell units includes n ATM cell header buffer for storing an ATM cell header into a cell header buffer or outputting data by 1 bit at a buffer according to a control signal output from a write controller or a read controller, a write controller to separate and store a cell header and a payload, read controller to sequentially the mixed output data from the interleaver memory, an interleaver memory for using payload data of ATM cells . . . , and a multiplexor for multiplexing 12 byte data output from the interleaver memory, wherein a 8 bit interleaver is directly added to the conventional ATM processing method since all ATM cells are to be processed by 8 bit parallel unit, and all interleaving process may be performed in parallel without any serial/parallel converting circuit, thereby achieving a device which is proper for low speed wireless environment.

10 Claims, 8 Drawing Sheets

ATM CELL INTERLEAVER CELL

INTERLEAVER FOR PARALLEL 8 BIT CELL OF ATM SYSTEMS AND A METHOD THEREFOR

BACKGROUND OF THE INVENTION

1. Field of the Invention

The present invention relates to an ATM (asynchronous transfer mode) system for interleaving 8 bit parallel cell and a method thereof, in which ATM cells may be interleaved by parallel 8 bits in such a way that 40 bits in a cell header are positioned over the whole cell including the header and a payload thereof with an interval of 10 bits, when the cells are being transferred through wireless channels, so that cell loss rate due to burst error characteristics is reduced.

2. Description of the Conventional Art

Conventionally, asynchronous transfer mode cells are transferred in optical fiber or wireline environments and protocols thereof are fitted to corresponding situations.

Referring to algorithm for abolishing cells, error of 1 bit in an ATM cell header may be corrected, but a cell should be abolished if 2 or more bit errors occur.

If the conventional cell abolish algorithm is adopted in cell transfer by using wireless channels and environments thereof are kept equally to that of the conventional in wire environments, then a random BER (Burst Error Rate) as well as a continuous BER are occur simultaneously due to the wireless channel characteristics, thereby increasing a cell loss rate and degrading the transfer performance.

Conventionally, a serial interleaver interleaves all data by bit while writing the data in the memory.

However, the conventional serial interleaver has a disadvantage that the serial interleaver can not perform direct interleaving, when the interleaver is provided to a parallel circuit for processing conventional ATM cells or a device, so that an additional serial/parallel converter is required.

The conventional serial interleaver has another disadvantage that the stability or operation speed of the whole circuitry is limitative, since the circuitry requires 8 times higher clocks than the conventional circuitry. Especially, the conventional serial interleaver has a further disadvantage that a random BER as well as a continuous BER occur simultaneously due to characteristics of the wireless channel, so that a cell loss rate increases and the transfer performance is degraded.

SUMMARY OF THE INVENTION

The present invention is derived to resolve the disadvantages of the conventional techniques and it is an object of the present invention to provide an ATM system for interleaving cells by parallel 8 bits and a method thereof, in which all ATM cells are processed by parallel 8 bits in all interleaving process, so that an 8 bit interleaver is directly added to the conventional ATM system and performs cell interleaving in parallel without any serial/parallel converting circuit, thereby achieving a device which, is proper for wireless environments of low speed.

According to one aspect of the present invention, the above objects may be resolved by an interleaver for interleaving cells by parallel 8 bits, which includes:

an ATM cell header buffer for storing an ATM cell header into a predetermined cell header buffer according to a control signal output from a write controller, or outputting data by 1 bit at a predetermined buffer according to a control signal output from a read controller, a write controller for controlling to separately store a cell header and a payload according to a start signal representative of a beginning of cell input and an interleaver signal, a read controller for controlling to sequentially output data which are mixed with the header and the payload in an interleaver memory, an interleaver memory for writing a data of a ATM cell payload to a predetermined buffer among 9 buffers according to a control signal output from the write controller, and a multiplexor for multiplexing 12 byte data output from the interleaver memory according to a controller signal from the read controller.

According to the ATM system for interleaving cells by parallel 8 bits of the present invention, the interleaver memory includes a decoder for selecting a buffer to write data among nine byte unit buffers and a converter for converting 9 bytes input from the decoder to 10 bytes.

According to the ATM system having an interleaver of 8 bit parallel cell units of the present invention, the converter comprises a plurality of D flip-flops in which the 9 bytes are stored, and a mixer for mixing the 9 byte data of the D flip-flop with 1 byte of the header to make 10 bytes.

According to one aspect of the present invention, the above objects may be resolved by a method for interleaving ATM cells by parallel 8 bits, which includes the steps of:

inputting ATM cell data to an interleaver from an HEC processing part of an ATM physical layer in an ATM network;

delaying the input data for 1 clock period by a D flip-flop of the interleaver for assuring an operation time of a controller;

generating an enabling signal to an ATM cell header buffer according to a start signal representative of cell input from the write controller and a signal representative of interleaving method;

generating an enabling signal for writing data and an address signal representative of position to write the data;

generating start byte of the enabling signal and the start signal to the read controller;

transmitting from the read controller to the ATM cell header buffer, a header 1 bit output enabling signal after two clocks of the start signal and a control signal to output a header bit of a next byte after outputting 8 bits and shifting header buffers of 5 bytes;

storing ATM cell headers at corresponding positions according to the control signal output from the write controller and outputting data by 1 bit at a predetermined buffer according to a control signal output from the read controller;

writing payload data of the ATM cell at a predetermined position in an interleaver memory while outputting data of 12 bytes which are mixed with the header bits;

outputting the 12 bytes of the interleaver memory from a multiplexor in a certain sequence according to selection signal outputs from the read controller; and outputting data from the D flip-flop through a wireless transmitter at an accurate timing with clocks by delaying for a certain time period, the D flip-flop being connected to an output terminal of the multiplexor.

According to the above method of this invention, a cell header may be recovered even though continuous errors occurs in 10 or less bits while transmission, since each cell is transmitted by interleaving 40 bits of its header with an interval of 10 bits over the header and payload areas of the cell.

Further, the interleaving is performed in parallel, so that it becomes possible to adopt this interleaving method to a conventional serial processing circuit without any serial/parallel converter. Especially, it becomes possible to reduce operational clocks comparing to the conventional serial processing circuit.

BRIEF DESCRIPTION OF THE DRAWINGS

The present invention will become more fully understood from the detailed description given hereinbelow accompanying drawings which are given by way of illustration only, and thus are not limitative of the present invention, and wherein.

DETAILED DESCRIPTION OF THE INVENTION

Figure 2:
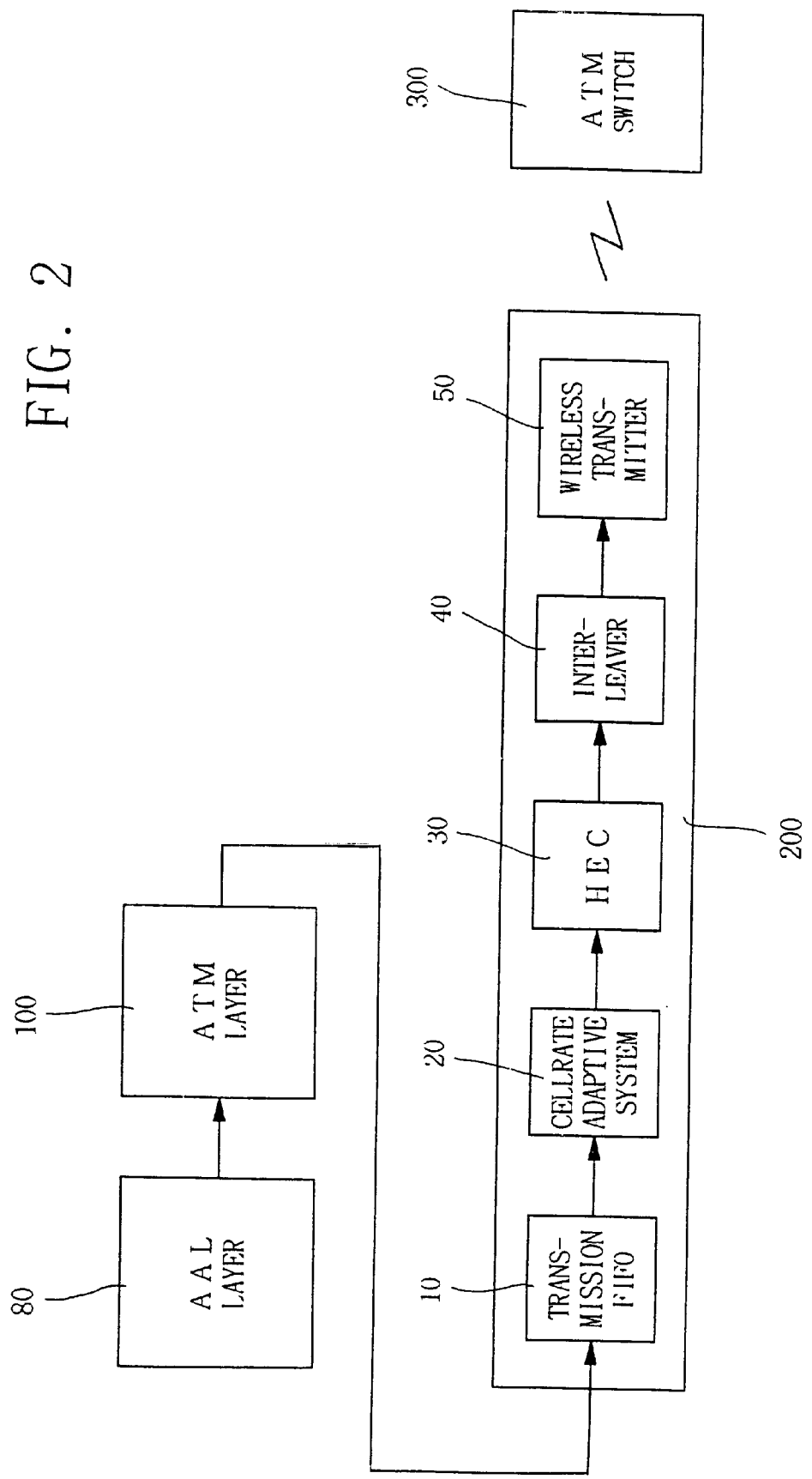
FIG. 2 is a schematic block diagram for explaining ATM nets according to the present invention.

FIG. 2 shows a schematic structure of ATM net according to the present invention.

In FIG. 2, the ATM network includes an AAL layer 80 for dividing packet data into 48 bytes, the packet data being usually transferred from a computer, an ATM layer 100 for adding 5 byte header to information of users' who are using 48 bytes, an ATM physical layer 200 for adding an empty cell to an 53 byte cell output from the ATM layer 100 to insert it into an SDH (Synchronous Digital Hierarchy) frame, and a ATM switch 300 to receive a signal output from the physical layer 200 and to transmit the signal to a receiver.

The ATM physical layer 200 includes a transmitting FIFO 10 for timing matching to the ATM layer 100, a cell rate adaptive system 20 connected to the transmitting FIFO (First-In-First-Out) 10 for matching speed thereof with that of the ATM layer 100, an HEC (Header Error Control) processing part 30 connected to the cell rate adaptive system 20 for performing CRC (Cyclic Redundance Check)-8 calculation for cell boundary discrimination, 1 bit error correction or multiple bit error detection function, an interleaver 40 with parallel 8 bit unit connected to an output terminal of the HEC processing part 30 for inserting respective one bit of 40 bits to the payload with an interval of 10 bits, and a wireless transmitter 50 for optically transmitting cell output from the interleaver 40 to the ATM switch 300.

Figure 3:
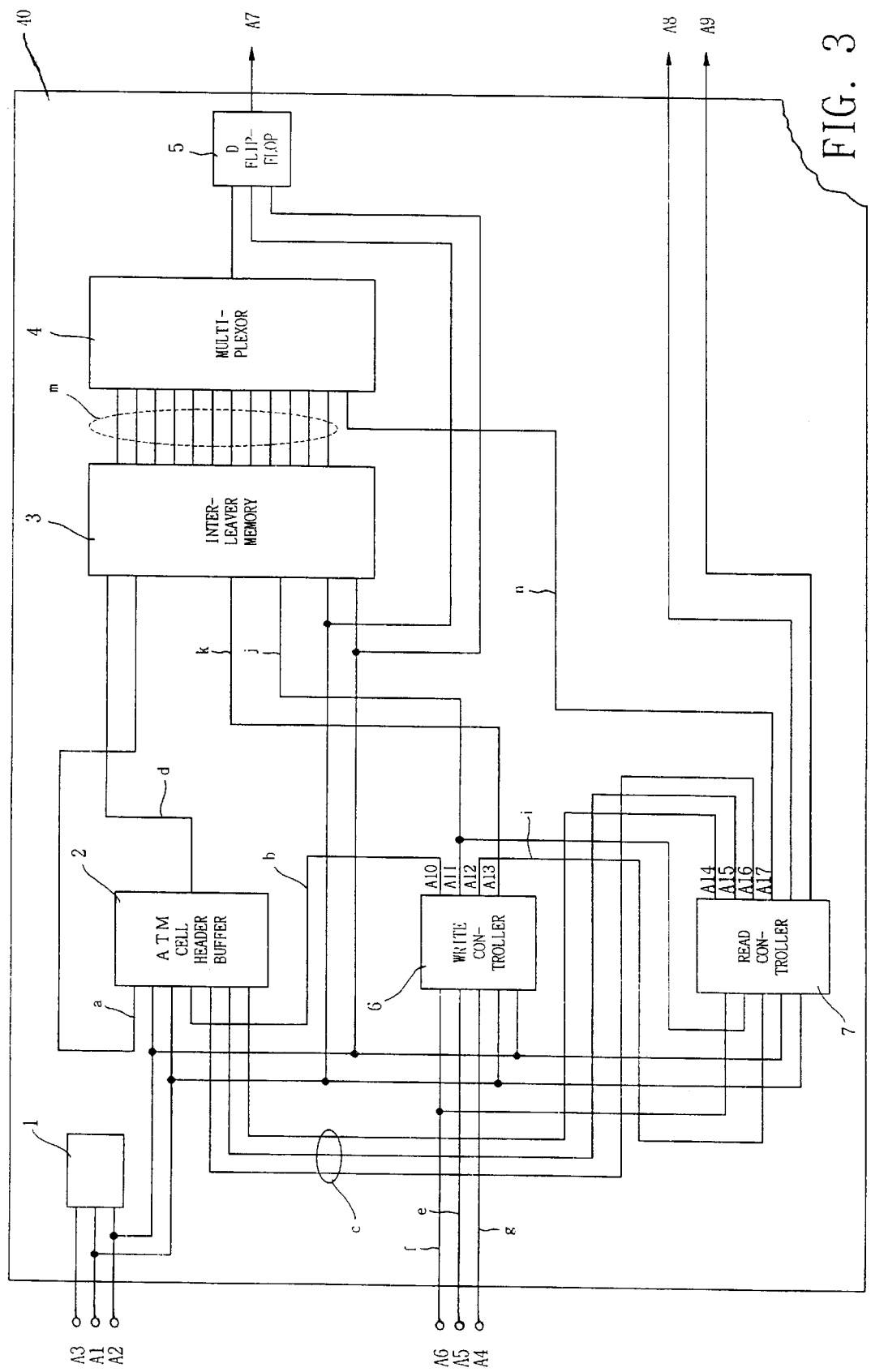
FIG. 3 is a schematic block diagram for illustrating the interleaver of 8 bit parallel cell units according to the present invention.

FIG. 3 shows a detailed structure of a main part of the invention, that is, the interleaver 40 as shown in FIG. 2. In FIG. 3, the interleaver 40 includes a D flip-flop 1 for delaying an input signal from the HEC processing part 30 for a 1 clock time period to assuring sufficient time period for a controller, an ATM cell header buffer 2 for storing ATM cell headers at respective predetermined cell header buffers according to a control signal from the write controller or outputting data by 1 bit at respective predetermined buffers according to the control signal of the read controller, a write controller 6 for separately storing cell header and payload according to a start signal representative of beginning of cell input and an interleaver signal, and outputting an enabling signal for writing data at the interleaver memory and an address signal representative of position to write the data, a read controller 7 for controlling to sequentially output data which is mixed with the cell header and the payload in the interleaver memory and to output a control signal to the ATM cell header buffer 2 for skipping 1 bit every 4 bytes, an interleaver memory 3 having 9 bytes for write payload data of an ATM cell at a predetermined position according to a control signal output from the write controller, while outputting data of 12 bytes mixed with header bits, a multiplexor 4 for multiplexing the 12 byte data output from the interleaver memory 3 according to the control signal n of the read controller, and a D flip-flop 5 for outputting an input signal from the multiplexor 4 at an accurate timing after delaying the signal for a predetermined time period.

The ATM cell header buffer 2 has buffers enough to store 5 cell headers, wherein interleaving per 1 cell uses only 1 cell header buffer while interleaving per 5 cells uses all the 5 cell header buffers.

The ATM cell header buffer 2 is provided with a parallel ATM data of 8 bits (a), 5 control signals to write headers at each predetermined header buffer (b) and a shifting control signal to output data after shifting 1 bit (c), and outputs 1 bit of header (d).

The write controller 6 is provided with a control signal representative of beginning of cell input (e), a control signal for controlling interleave in one cell unit or 5 cell unit (f and a data enabling signal (g), and outputs data writing signals U) and (k).

The read controller 7 is provided with a control signal for one cell or 5 cell (f), and start signal for beginning to write data (i). In case of 1 cell interleaving, the read controller 7 outputs header bits only from 1 header buffer which is used in the ATM cell header buffer 2. On the other hand, the read controller 7 outputs header bits by one bit in sequence from all the 5 header buffers in case of 5 cell interleaving.

Figure 4:
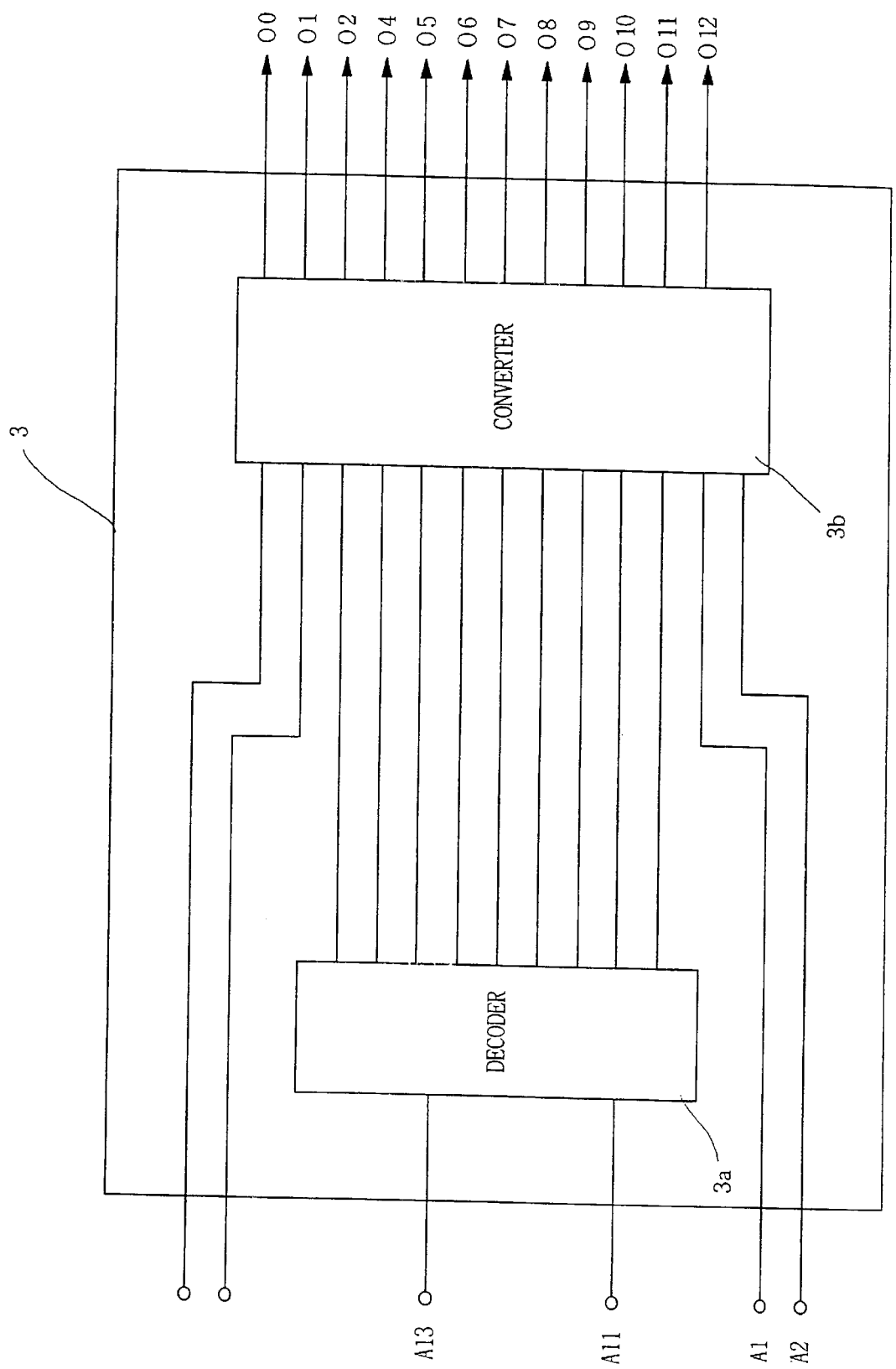
FIG. 4 is a detailed block diagram for illustrating an interleaver memory.

FIG. 4 shows a structure of the interleaver memory 3 in detail. In FIG. 4, the interleaver memory 3 includes a decoder 3a for selecting a data to 1 buffer to write data among nine byte unit buffers and a converter 3b for converting 9 bytes input from the decoder 3a into 10 bytes.

Figure 5:
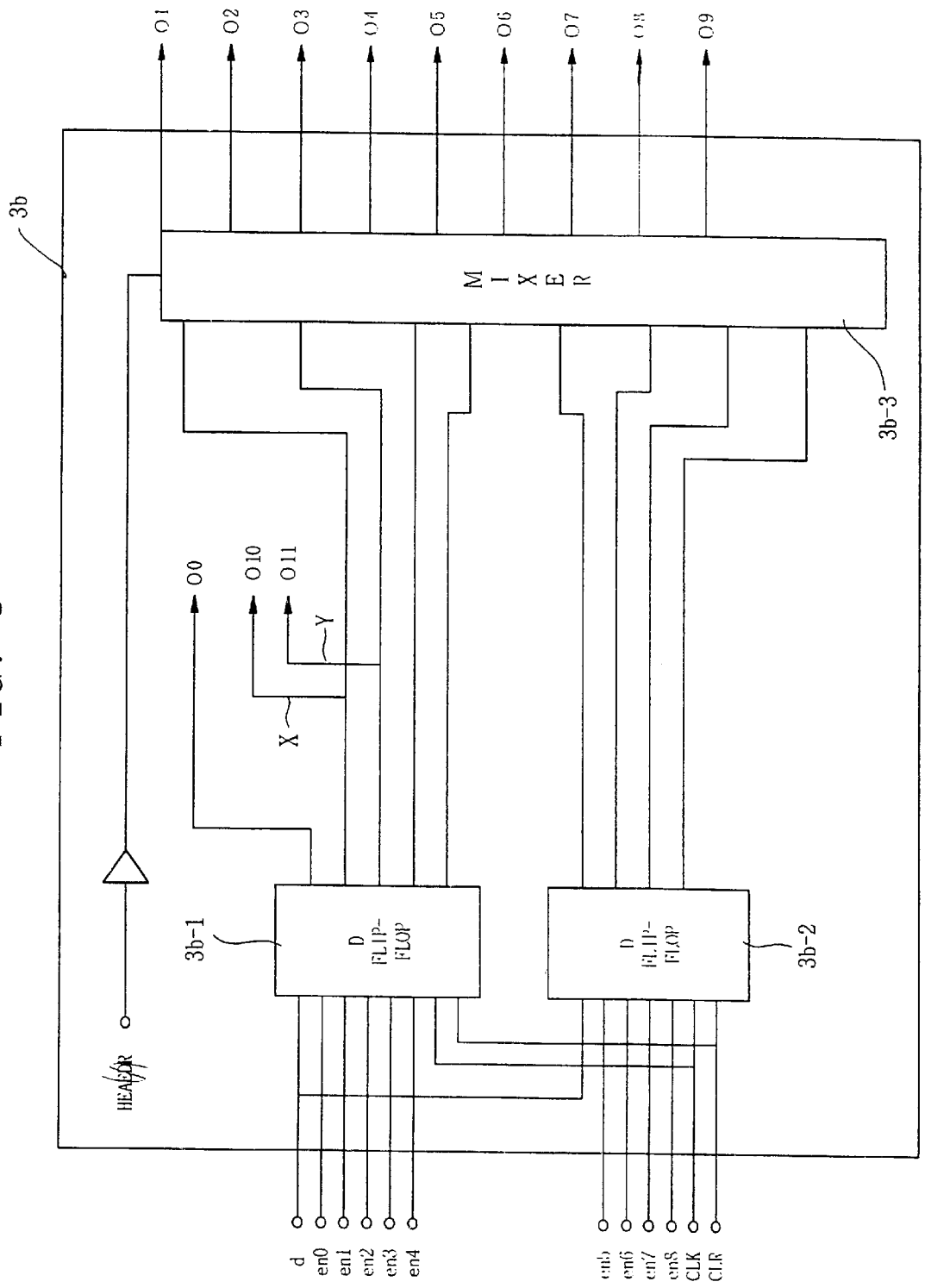
FIG. 5 is a detailed block diagram of a converter as shown in FIG. 4.

FIG. 5 shows a structure of the converter 3b of FIG. 4 in detail. In FIG. 5, the converter 3b includes D flip-flops 3b–1 and 3b–2 for storing the 9 bytes, and a mixer 3b–3 for mixing the 9 bytes from the D flip-flops 3b–1 and 3b–2 with 1 byte from the header to output 10 bytes.

Now, the operation of the interleaver 40 according to the present invention will be explained in detail.

Interleavers of cell unit are divided into two kinds, one is 1 cell unit for transmitting 40 bits of an ATM cell header by interleaving one bit in a payload with an interval of 10 bits through wireless channels, and a reversed process of such the interleaving is performed in a receiver. The other one is 5 cell unit, in which 40 bits of the header of the ATM cell header are interleaved in the payload with an interval of 50 bits through the wireless channels, and a reversed process of such the interleaving is performed in a receiver. In the receiver, only 1 header bit error is detected for a burst error of 50 or less bits so that the error may be corrected in a correction mode.

Figure 1:
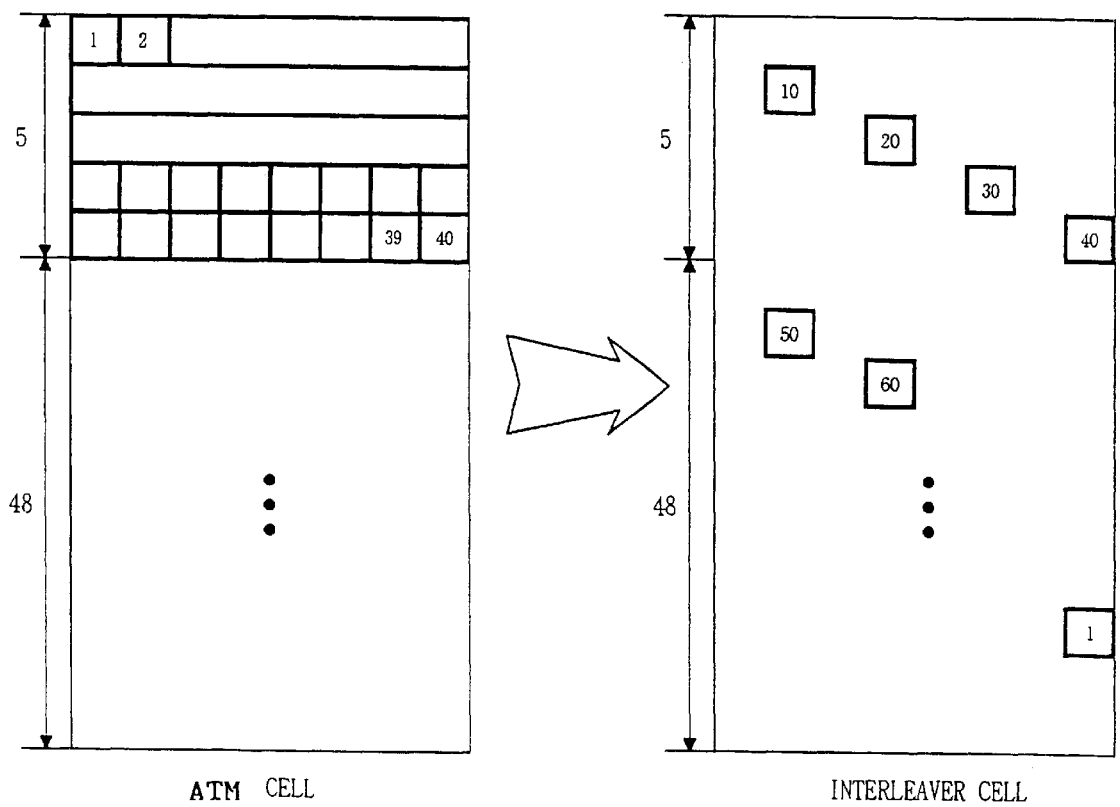
FIG. 1 is a schematic view for explaining the main principal of an interleaver of 8 bit parallel cell units according to an embodiment of the present invention.

The present invention is explained with reference to 1 cell unit interleaving as shown in FIG. 1.

In FIG. 1, a first bit of a header is positioned at a 10th bit of a payload, a second bit of the header is positioned at a 20th bit of the payload, and a third bit of the header is positioned at a 30th bit of the payload, so that a last 40th header bit is positioned at a 400th payload bit and remaining 401st bit to 424th bit of the payload are transmitted as they are.

FIG. 3 shows specific means for this interleaving. In FIG. 3, signals A1–A6 of FIG. 6 (ATM cell data) are input from the HEC part 30 of the ATM physical layer 200 as shown in FIG. 2 to the D flip-flop 1 of the interleaver 40, the ATM cell header buffer 2, the write controller 6 and the read controller 7, respectively.

The D flip-flop 1 delays the input data for 1 clock period for assuring required time for the write controller 6 and the read controller 7.

Figure 6:
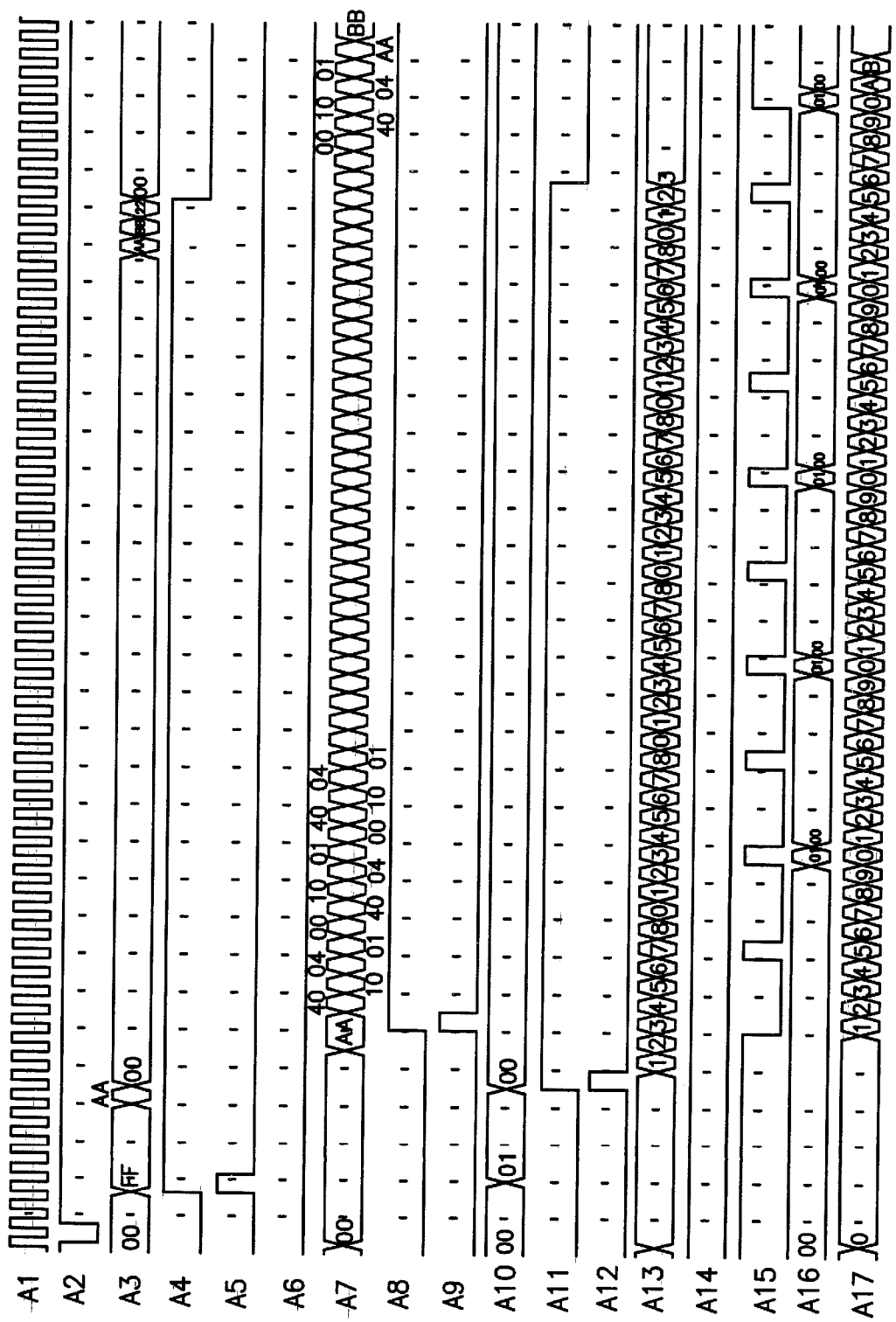
FIG. 6 is a time-chart for illustrating waveform output from respective parts as shown in FIG. 3.

The write controller 6 generates the enabling signal b, which corresponds to the signal A10 of FIG. 6, to the ATM cell header buffer 2 by using the start signal e indicating the cell input, which corresponds to the signal A5 of FIG. 6, and the signal f indicating the interleaving unit—1 cell unit or 5 cell unit, thereby storing the cell header and the payload separately.

According to the present invention of 1 cell unit interleaving, only a first signal among 5 byte signals becomes 1, while all the 5 byte signals of each input cell become 0 to 4 and are output to the 5 different header buffers in sequence of 0, 2, 4, 1 and 3 repeatedly.

Further, the write controller 6 generates the enabling signal j, which corresponds to the signal A11 of FIG. 6, for writing data at the 9 byte unit buffers of the interleaver memory 3, and the address signal k, which corresponds to the signal A13 of FIG. 6, for indicating a writing position.

The address signal k repeats 5 times from address 0 to address 8 and assigned address 0 to address 2, so that totally 48 bytes of the ATM cell payload may be written in the interleaver memory 3.

The write controller 6 generates each beginning byte of an enabling signal j corresponding to the signal A11 as shown in FIG. 6 and an address signal i corresponding to the signal A12 as shown in FIG. 6 to the read controller 7.

The read controller 7 shifts a header 1 bit output enabling signal A15 of FIG. 6 after two clocks of the signal i, corresponding to the signal A12 of FIG. 6, and 5 bytes of the header buffers after outputting 8 bits, so that the control signal c corresponding to the signal A16 of FIG. 6 is generated to output a header bit of a next byte to the ATM cell header buffer 2.

At this time, the signal A14 of FIG. 6, which is transmitted from the read controller 7 to the ATM cell header buffer 2, is to select 5 header buffers in the ATM cell header buffer 2 and fixed to "0" since it reveals interleaving operation by 1 cell unit.

On the other hand, "0" to "4" are repeatedly output whenever a header bit is output in the interleaving operation of 5 cell-unit.

The ATM cell header buffer 2 stores the ATM cell header at a predetermined position according to the control signal output from the write controller 6, and outputs data by 1 bit from a predetermined buffer according to the control signal output from the read controller 7.

The ATM cell header buffer 2 has five buffers for storing five cell headers, wherein only one buffer is used in case of interleaving while all the buffers are used in case of interleaving by five (5) cell unit.

The interleaver memory 3 receives the enabling signal j for writing data in a buffer of 9 byte unit and the address signal k indicating the writing positions from the write controller 6. The interleaver memory 3 writes the payload data of the ATM cell at the 9 buffers and outputs 12 byte data being mixed with the header bits.

That is, the decoder 3a of the interleaver memory 3 operates to write data at a respective one buffer among the 9 buffers according to the enabling signal j which is input from the write controller 6.

The 9 bytes from the decoder 3a are provided to the converter 3b and converted to 10 bytes in the converter 3b.

FIG. 5 shows a structure of the converter 3b in more detail. In FIG. 5, D flip-flop 3b–1 has 5 enabling input terminals en0–en4, and D flip-flop 3b–2 has 4 enabling input terminals en5–en8, so that 5 bytes are input through the D flip-flop 3b–1 and 4 bytes are input through the D flip-flop 3b–2, thereby totally 9 byte signal is received at the converter 3b.

The D flip-flops 3b–1 and 3b–2 store the enabling signal when this enabling signal is 1 (high level) and keep a former value when the enabling signal is 0 (low level).

The mixer 3b–3 mixes the 9 bytes output from the D flip-flops 3b–1 and 3b–2 with 1 byte from the 1 header byte, thereby providing 10 bytes to the multiplexor 4.

Referring to FIG. 5, even though 9 bytes (01–09) are output through the mixer 3b–3, 10 bytes are totally output since 1 byte (0o) is output from the D flip-flop 3b–1. Referring to FIG. 4, the 9 bytes subjected by the mixer 3b–3 and the remaining 3 bytes (0o, 010 and 011) are added to 12 bytes (0o–011).

The D flip-flop 3b–1 is provided with two more output terminals x, y, so that 51, 52 and 53 bytes which are not mixed with the header bits may be output through these output terminals s and y.

In other words, 10 byte data which is interleaved by mixing the payload 9 bytes with the header 1 byte through the interleaver memory 3 as well as the 51, 52 and 53 bytes of the ATM cell are output from the multiplexor 4.

The multiplexor 4 receives a selecting signal n, which corresponds to the signal A17 of FIG. 6, from the read controller 7 to output 12 data in sequence, wherein the selecting signal n is repeated 5 times from 0 to 9 and then followed by the remaining 3 bytes 0, A (010), B (011), thereby summed up 53 bytes.

The output terminal of the multiplexor 4 is connected with the D flip-flop 5 so that data may be output from the multiplexor 4 at an accurate timing with clocks.

The data enabling signal A8 of FIG. 6 and the cell input beginning signal A9 of FIG. 6 of output data should be provided to the wireless transmitter 50 in consideration of the delay time due to the operation of the read controller 7.

If all the header 5 bytes of the input data are arbitrarily "1" and a 6th and a 51st to a 53d byte data, which are not influenced by the interleaving operation, are respectively input "AA", "AA", "BB" and "CC", the output A7 of FIG. 6 may be obtained.

Figure 7:
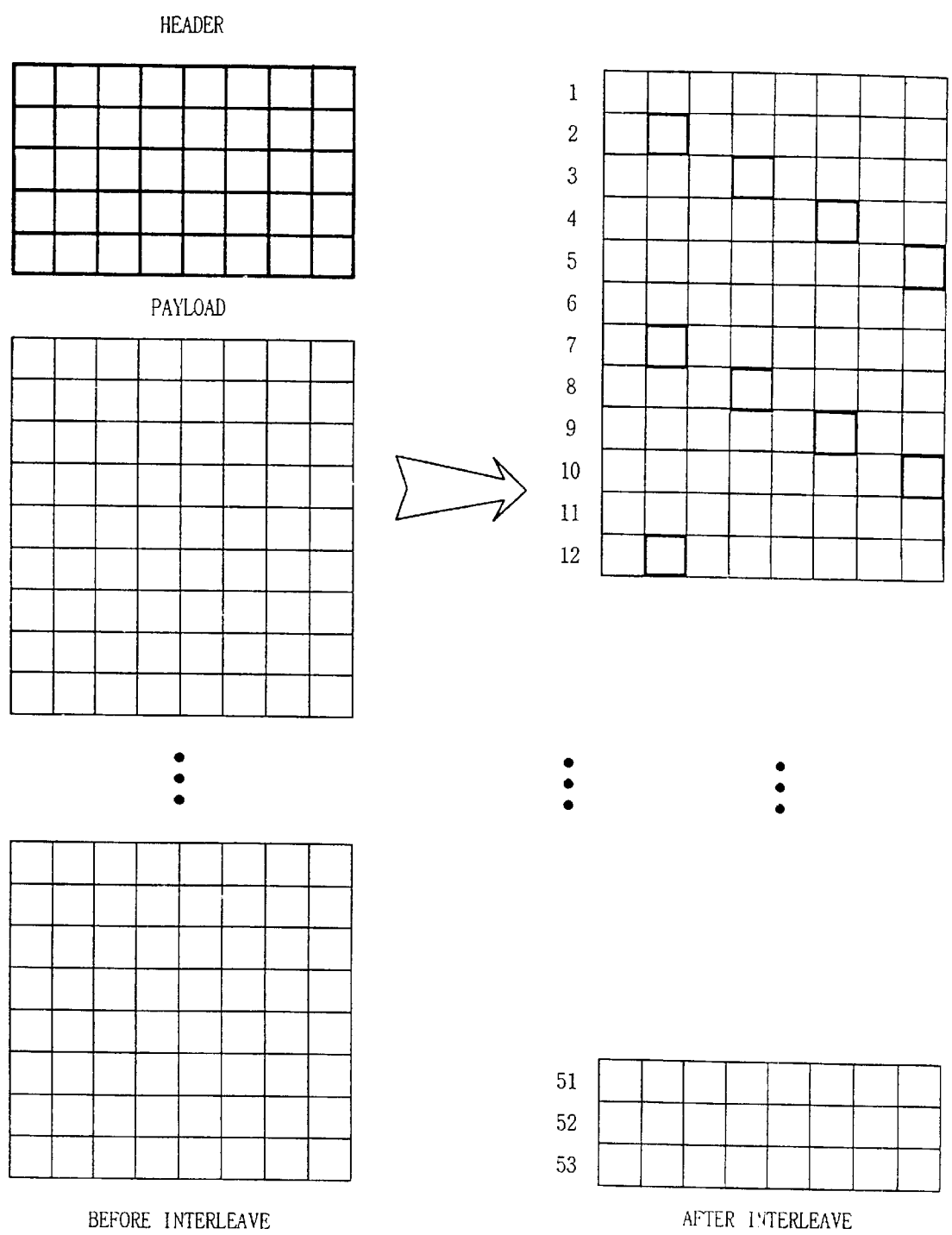
FIG. 7 is a schematic view for explaining interleaving results of the interleaver according to the present invention.

In FIG. 7, the headers and payloads before and after the interleaving are mixed each other, and a minimum period required for the parallel interleaving is 10 bytes, that is, the 1 byte of the header and the 9 bytes of the payload make the 10 bytes of interleaved data.

This period is repeated 5 times and then the last 3 bytes are outputted, so that the 5 bytes of the header memory and the 9 bytes of the payload memory may be interleaved per byte.

Figure 8:
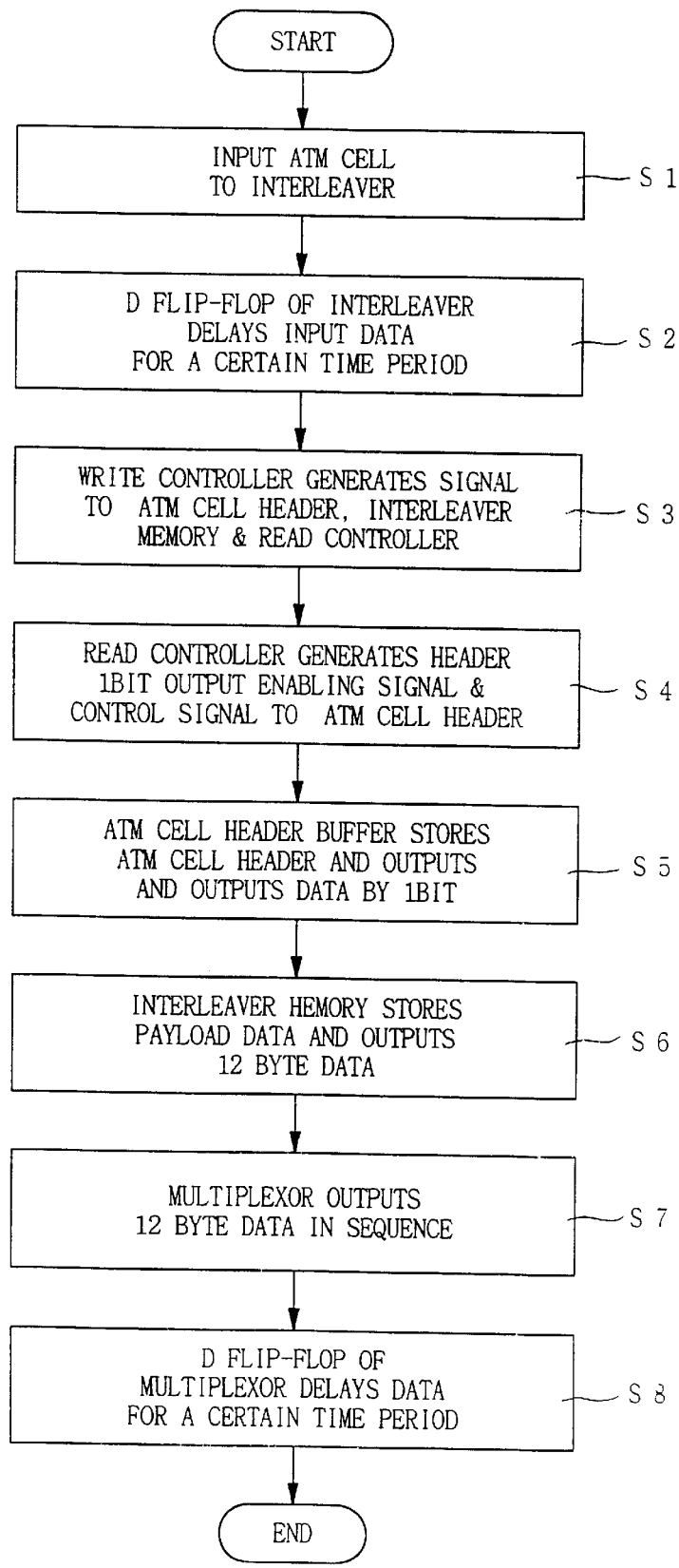
FIG. 8 is a flow chart for explaining the operation of the 8 bit parallel cell interleaving according to the present invention.

FIG. 8 is a flow chart for explaining the operation of the 8 bit parallel cell interleaving according to the present invention. In FIG. 8, a method for interleaving ATM cells by parallel 8 bits according to the present invention includes the steps of inputting ATM cell data to an interleaver from an HEC processing part of an ATM physical layer in an ATM network (S1), delaying the input data for 1 clock period by a D flip-flop of the interleaver for assuring an operation time of a controller (S2), generating an enabling signal b to an ATM cell header buffer according to a start signal e representative of cell input from the write controller and a signal f representative of interleaving method, generating an enabling signal j for writing data and an address signal k representative of position to write the data, and generating start byte of the enabling signal j and the start signal i to the read controller (S3), transmitting from the read controller to the ATM cell header buffer, a header 1 bit output enabling signal after two clocks of the address signal i and the control signal c to output a header bit of a next byte after outputting 8 bits and shifting header buffers of 5 bytes (S4), storing ATM cell headers at corresponding positions according to the control signal output from the write controller and outputting data by 1 bit at a predetermined buffer according to a control signal output from the read controller (S5), writing payload data of the ATM cell at a predetermined position in an interleaver memory while outputting data of 12 bytes which are mixed with the header bits (S6), outputting the 12 bytes of the interleaver memory from a multiplexor in a certain sequence according to selection signals n output from the read controller (S7), and outputting data from the D flip-flop through a wireless transmitter at an accurate timing with clocks by delaying for a certain time period, the D flip-flop being connected to an output terminal of the multiplexor (S8).

EFFECT OF THE INVENTION

As described hereinabove, according to the present invention, a 8 bit interleaver is directly added to the conventional ATM processing method since all ATM cells are to be processed by 8 bit parallel unit, and all interleaving process may be performed in parallel without any serial/parallel converting circuit, thereby achieving a device which is proper for low speed wireless environment.

According to the above method of this invention, a cell header may be recovered even though continuous errors occurs in 10 or less bits while transmission, since each cell is transmitted by interleaving 40 bits of its header with an interval of 10 bits over the header and payload areas of the cell.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. In ATM systems which comprises an AAL layer, an ATM layer, and an ATM physical layer and transmits packet data from a terminal to an ATM switch by using 48 bytes in a cell composed of 53 bytes through wireless environments, an interleaver interposed between a HEC part of the ATM physical layer and the wireless transmitter, comprising:
   a plurality of D flip-flops for delaying an input signal from the HEC part for 1 clock time period;
   an ATM cell header buffer for storing an ATM cell header into a cell header buffer according to a control signal output from a write controller, or outputting data by 1 bit at a buffer according to a control signal output from a read controller;
   a write controller for controlling to separately store a cell header and a payload according to a start signal representative of a beginning of cell input and an interleaver signal, and generating an enabling signal for writing data in an interleaver memory and an address signal for indicating writing positions;
   a read controller for controlling to sequentially output data which are mixed with the header and the payload in the interleaver memory, and producing a control signal to the ATM cell header buffer for skipping 1 bit every 4 bytes;
   an interleaver memory for writing ATM cell payload data at a predetermined position according to a control signal output from the write controller, and producing 12 byte data which is mixed with header bits;
   a multiplexor for multiplexing 12 byte data output from the interleaver memory according to a controller signal from the read controller; and
   a D flip-flop for delaying data output from the multiplexor for a predetermined time period for accurate timing with clocks.

2. The interleaver according to claim 1, wherein said ATM cell header buffer has five buffers to store five cell headers, wherein only one buffer is used in case of interleaving by one cell unit, while all the five buffers are used in case of interleaving by five cell unit.

3. The interleaver according to claim 1, wherein said ATM cell header buffer outputs header bits from one buffer in case of interleaving by one cell unit, while outputs alternatively header bits from five buffers by one bit from each buffer in case of interleaving by five cell unit.

4. The interleaver according to claim 1, wherein the interleaver memory includes a decoder for selecting a buffer to write data among nine unit buffers and a converter for converting 9 bytes input from the decoder to 10 bytes.

5. The interleaver according to claim 4, wherein the converter includes a plurality of D flip-flops to store 9 bytes, and a mixer for mixing the 9 bytes from the plurality of D flip-flops and the 1 byte from the header to make 10 bytes.

6. The interleaver according to claim 1, wherein an address signal transmitted from said write controller to said interleaver memory is repeated 5 times from 0 to 8 and then followed by remaining 3 bytes 0, 1, and 2, so as to be summed to 48 bytes of a payload of an ATM cell.

7. The interleaver according to claim 1, wherein a selecting signal transmitted from said read controller to said multiplexor is repeated 5 times from 0 to 9 and then followed by remaining 3 bytes 0, A, and B, so as to be summed to 53 bytes.

8. A method for interleaving ATM cells by parallel 8 bits comprising the steps of:
   inputting ATM cell data to an interleaver from an HEC processing part of an ATM physical layer in an ATM network;

delaying the input data for 1 clock period by a D flip-flop of the interleaver for assuring an operation time of a controller;

generating an enabling signal to an ATM cell header buffer according to a start signal representative of cell input from the write controller and a signal representative of interleaving method, generating an enabling signal for writing data and an address signal representative of position to write the data, and generating start byte of the enabling signal and the start signal to the read controller;

transmitting from the read controller to the ATM cell header buffer, a header 1 bit output enabling signal after two clocks of the address signal and the control signal to output a header bit of a next byte after outputting 8 bits and shifting header buffers of 5 bytes;

storing ATM cell headers at corresponding positions according to the control signal output from the write controller and outputting data by 1 bit at a predetermined buffer according to a control signal output from the read controller;

writing payload data of the ATM cell at a predetermined position in an interleaver memory while outputting data of 12 bytes which are mixed with the header bits;

outputting the 12 bytes of the interleaver memory from a multiplexor in a certain sequence according to selection signals n output from the read controller; and outputting data from the D flip-flop through a wireless transmitter at an accurate timing with clocks by delaying for a certain time period, the D flip-flop being connected to an output terminal of the multiplexor.

9. The method according to claim 8, wherein the address signal (k) is repeated 5 times from 0 to 8 and then followed by remaining 3 bytes 0, 1, and 2, so as to write 48 bytes of a payload of an ATM cell in the interleaver memory.

10. The method according to claim 8, wherein the ATM cell header buffer has five buffers for storing five cell headers, wherein only one buffer is used in case of interleaving by one (1) cell unit, while all the five buffers are used in case of interleaving by five (5) cell unit.

* * * * *